United States Patent
Kamiya et al.

(10) Patent No.: US 12,269,919 B2
(45) Date of Patent: Apr. 8, 2025

(54) POLYBUTYLENE TEREPHTHALATE RESIN COMPOSITION

(71) Applicant: TOYOBO CO., LTD., Osaka (JP)

(72) Inventors: Motonobu Kamiya, Otsu (JP); Yasuto Fujii, Osaka (JP); Takahiro Shimizu, Otsu (JP); Kaori Furukawa, Otsu (JP)

(73) Assignee: TOYOBO MC CORPORATION, Osaka (JP)

(*) Notice: Subject to any disclaimer, the term of this patent is extended or adjusted under 35 U.S.C. 154(b) by 562 days.

(21) Appl. No.: 17/441,833

(22) PCT Filed: Mar. 24, 2020

(86) PCT No.: PCT/JP2020/013000
§ 371 (c)(1),
(2) Date: Sep. 22, 2021

(87) PCT Pub. No.: WO2020/196512
PCT Pub. Date: Oct. 1, 2020

(65) Prior Publication Data
US 2022/0195112 A1    Jun. 23, 2022

(30) Foreign Application Priority Data
Mar. 26, 2019   (JP) ................. 2019-058189

(51) Int. Cl.
C08G 63/183   (2006.01)
C08K 3/26   (2006.01)
C08K 3/40   (2006.01)
C08K 7/14   (2006.01)
C08L 69/00   (2006.01)

(52) U.S. Cl.
CPC ............. *C08G 63/183* (2013.01); *C08K 3/26* (2013.01); *C08K 3/40* (2013.01); *C08K 7/14* (2013.01); *C08L 69/00* (2013.01); *C08K 2003/265* (2013.01); *C08L 2201/08* (2013.01); *C08L 2205/025* (2013.01); *C08L 2205/035* (2013.01)

(58) Field of Classification Search
CPC ............ C08G 63/183; C08K 2003/265; C08K 3/26; C08K 3/40; C08K 7/14; C08K 7/20; C08L 2201/08; C08L 2205/02; C08L 2205/025; C08L 2205/035; C08L 67/02; C08L 69/00
See application file for complete search history.

(56) References Cited

U.S. PATENT DOCUMENTS

| 4,113,692 A | 9/1978 | Wambach |
| 4,222,926 A * | 9/1980 | Mizuno ............ C08L 31/04 525/169 |
| 2004/0180990 A1 | 9/2004 | Suzuki et al. |
| 2007/0129475 A1 | 6/2007 | Sakata et al. |
| 2010/0196719 A1 | 8/2010 | Aoki et al. |
| 2012/0022190 A1 | 1/2012 | Nagano et al. |
| 2013/0210981 A1 | 8/2013 | Monden |
| 2022/0195112 A1 | 6/2022 | Kamiya et al. |

FOREIGN PATENT DOCUMENTS

| CN | 102388103 | 3/2012 |
| CN | 102942774 | 2/2013 |
| CN | 105377983 | 3/2016 |
| JP | 50-1146 | 1/1975 |
| JP | 53-144955 | 12/1978 |
| JP | 11-106624 | 4/1999 |
| JP | 2001-234046 | 8/2001 |
| JP | 2002-234991 | 8/2002 |
| JP | 2004-269765 | 9/2004 |
| JP | 2008-184482 | 8/2008 |
| JP | 2009-7482 | 1/2009 |
| JP | 2013-173822 | 9/2013 |
| JP | 2013-203869 | 10/2013 |
| JP | 2017-39878 | 2/2017 |
| JP | 6414467 | * 10/2018 |
| JP | 7409372 | 1/2024 |
| WO | 2005-035657 | 4/2005 |
| WO | 2014/088105 | 6/2014 |
| WO | 2015/008831 | 1/2015 |

OTHER PUBLICATIONS

Deshmukh et al "Effect of uncoated calcium carbonate and stearic acid coated calcium carbonate on mechanical, thermal and structural properties of poly(butylene terephthalate) (PBT)/calcium carbonate composites", Bull. Mater. Sci., vol. 33, No. 3, Jun. 2010, pp. 277-284. (Year: 2010).*
Extended European Search Report issued Sep. 29, 2022 in corresponding European Patent Application No. 20779214.4.
International Search Report (ISR) issued Jun. 9, 2020 in International (PCT) Application No. PCT/JP2020/013000.
Notice of Reasons for Refusal issued Aug. 18, 2023 in corresponding Japanese Patent Application No. 2021-509447, with English language translation.
Decision to Grant a Patent issued Nov. 21, 2023 in corresponding Japanese Patent Application No. 2021-509447, with English language translation.

(Continued)

*Primary Examiner* — Frances Tischler
*Assistant Examiner* — Gennadiy Mesh
(74) *Attorney, Agent, or Firm* — Wenderoth, Lind & Ponack, L.L.P.

(57) ABSTRACT

The present invention relates to a polybutylene terephthalate resin composition comprising 20 to 50 mass % of a polybutylene terephthalate resin (A) having an intrinsic viscosity of 0.60 to 1.0 dl/g, 20 to 45 mass % of a fibrous filler (B), 1 to 20 mass % of a polycarbonate resin (C) having a melt volume rate (MVR) of 30 $cm^3$/10 min or more, 3 to 20 mass % of a copolymerized polybutylene terephthalate resin (D), and 0 to 20 mass % of an inorganic filler (E) other than the fibrous filler (B). The polybutylene terephthalate resin composition can form a molding that remedies sink marks, maintains high heat deflection temperature, and has excellent appearance.

1 Claim, No Drawings

(56) References Cited

OTHER PUBLICATIONS

Office Action issued Oct. 10, 2022 in Chinese Patent Application No. 202080024330.8, with English-language translation.
Office Action issued May 8, 2024 in Indonesian Patent Application No. P00202109114, with English-language Translation.

* cited by examiner

POLYBUTYLENE TEREPHTHALATE RESIN COMPOSITION

TECHNICAL FIELD

The present invention relates to a polybutylene terephthalate resin composition that reduces the occurrence of sink marks during molding and maintains a high heat deflection temperature.

BACKGROUND ART

Generally, due to excellence in mechanical properties, heat resistance, chemical resistance, etc., polybutylene terephthalate resins have been widely used for automobile parts, electric and electronic parts, household utensils, etc. From the viewpoints of weight reduction and cost reduction, thinning of those parts is ongoing. In order to satisfy the practical strength even for a thin molding, reinforcement has been devised by using a resin composition reinforced with glass fiber or the like, and arranging many ribs or bosses in a molding.

However, ribs or bosses arranged on a molding allow sink marks to stand out, spoiling the appearance in some cases.

In order to remedy such a problem, in Patent Literatures 1 and 2, a method is proposed in which crystallinity is suppressed by addition of amorphous polyamide or low-crystalline polyamide to crystalline polyamide and glass fiber, and sink marks are remedied by further addition of spherical filler for suppression of shrinkage in the thickness direction. However, addition of the amorphous component lowers the heat deflection temperature, causing a problem of insufficient toughness. Further, in Patent Literature 3, dispersing a bromine-based flame retardant and an antimony compound in a polybutylene terephthalate resin composition allows sink marks to be suppressed. However, the literature does not mention heat deflection temperature. Further, in Patent Literature 4, a polybutylene terephthalate resin composition capable of suppressing sink marks, which is obtained by blending a combination of a polybutylene terephthalate resin and a polycarbonate resin with a material for improving impact resistance of butadiene rubber, is proposed. However, the literature does not mention heat deflection temperature, and there are some problems that butadiene rubber causes a decrease in heat deflection temperature and an incompatible rubber component oozes out on the surface of a molding to spoil the appearance, and so forth.

CITATION LIST

Patent Literature

PTL 1: Japanese Patent Laying-Open No. 2009-7482
PTL 2: Japanese Patent Laying-Open No. 2013-203869
PTL 3: Japanese Patent Laying-Open No. 2013-173822
PTL 4: Japanese Patent Laying-Open No. 11-106624

SUMMARY OF INVENTION

Technical Problem

An object of the present invention is to provide a polybutylene terephthalate resin composition which can form a molding that remedies sink marks, maintains high heat deflection temperature, and has excellent appearance.

Solution to Problem

The present inventors have completed the present invention as a result of extensive studies on the constitution and properties of a polybutylene terephthalate resin composition in order to solve the problem described above.

In other words, the present invention has the following constitution.

[1] A polybutylene terephthalate resin composition comprising 20 to 40 mass % of a polybutylene terephthalate resin (A) having an intrinsic viscosity of 0.60 to 1.0 dl/g, 20 to 45 mass % of a fibrous filler (B), 1 to 20 mass % of a polycarbonate resin (C) having a melt volume rate (MVR) of 30 $cm^3$/10 min or more, 3 to 20 mass % of a copolymerized polybutylene terephthalate resin (D), and 0 to 20 mass % of an inorganic filler (E) other than the fibrous filler (B).

[2] The polybutylene terephthalate resin composition described in [1], further comprising 0 to 25 mass % of a polyethylene terephthalate resin (F).

[3] The polybutylene terephthalate resin composition described in [1] or [2], wherein a heat deflection temperature of the polybutylene terephthalate resin composition is 190° C. or more.

Advantageous Effects of Invention

According to the present invention, a polybutylene terephthalate resin composition may be provided which can form a molding that remedies sink marks and maintains high heat deflection temperature.

DESCRIPTION OF EMBODIMENTS

The present invention is specifically described as follows. The content (blending amount) of each component described below is expressed as an amount (mass %) relative to 100 mass % of a polybutylene terephthalate resin composition. Since the blending amount of each component represents the content in the polybutylene terephthalate resin composition, the blending amount coincides with the content.

[Polybutylene Terephthalate Resin (A)]

Polybutylene terephthalate resin (A) is a polymer that may be obtained by a conventional polymerization method such as polycondensation reaction between a dicarboxylic acid containing terephthalic acid or an ester-forming derivative thereof as a main component and a diol containing 1,4-butanediol or an ester-forming derivative thereof as a main component. Polybutylene terephthalate resin (A) has a repeating unit of butylene terephthalate in an amount of preferably 85 mol % or more, more preferably 90 mol % or more, still more preferably 95 mol % or more, particularly preferably 100 mol %.

The intrinsic viscosity (IV) of polybutylene terephthalate resin (A) is preferably 0.60 to 1.0 dl/g, more preferably 0.60 to 0.90 dl/g, still more preferably 0.65 to 0.88 dl/g. Regarding the polybutylene terephthalate resin composition produced in the present invention, with an intrinsic viscosity (IV) of the polybutylene terephthalate resin of more than 1.0 dl/g a decrease in the heat deflection temperature occurs, and with an intrinsic viscosity (IV) of less than 0.60 dl/g, a significant decrease in mechanical properties and chemical properties occur, which are not preferred. The intrinsic viscosity (IV) of polybutylene terephthalate resin (A) is obtained by dissolving 0.1 g of the resin in 25 ml of a mixed solvent of phenol/tetrachloroethane (mass ratio: 6/4), and measuring it at 30° C. with use of an Ubbelohde viscosity tube (unit: dl/g).

The content of polybutylene terephthalate resin (A) in the polybutylene terephthalate resin composition is 0 to 40 mass %, preferably 0 to 38 mass %, and more preferably 15 to 35 mass %. Blending polybutylene terephthalate resin (A) within the range allows various properties to be satisfied. Polybutylene terephthalate resin (A) in the present invention is a main component resin in all the resins in the polybutylene terephthalate resin composition of the present invention. It is preferable that the content be the largest among those of all the resins.

[Fibrous Filler (B)]

In the polybutylene terephthalate resin composition of the present invention, fibrous filler (B) may be blended for the purpose of improving heat resistance and rigidity within a range where the effects of the present invention are not impaired. Examples of fibrous filler (B) include glass fiber, carbon fiber, potassium titanate fiber, silica/alumina fiber, zirconia fiber, and metal fiber, and glass fiber is preferred.

As the glass fiber, any known glass fiber is preferably used without depending on the glass fiber diameter, the shape of a circular, cocoon-like or oval cross-section, the length and cutting method to be used in manufacturing chopped strands, rovings, or the like. In the present invention, the type of glass is not limited, and E glass and corrosion resistant glass containing zirconium element in the composition are preferably used in terms of quality.

Further, in the present invention, for the purpose of improving the interface properties between fibrous filler (B) and a resin matrix, a fibrous filler surface-treated with an organic treatment agent such as an aminosilane compound and an epoxy compound is preferably used. As the aminosilane compound and the epoxy compound used for the fibrous filler, any known compound may be preferably used without depending on the type of the aminosilane compound and the epoxy compound.

The content of fibrous filler (B) in the polybutylene terephthalate resin composition is 20 to 45 mass %, preferably 22 to 43 mass %, and more preferably 25 to 40 mass % Blending fibrous filler (B) within the range enables to obtain a polybutylene terephthalate resin composition having improved heat resistance and rigidity.

[Polycarbonate Resin (C)]

The polycarbonate in polycarbonate resin (C) of the present invention may be produced by a solvent method, i.e., a reaction between dihydric phenol and a carbonate precursor such as phosgene in the presence of a known acid acceptor and molecular weight modifier in a solvent such as methylene chloride, or a transesterification reaction between a dihydric phenol and a carbonate precursor such as diphenyl carbonate. Examples of the dihydric phenol preferably used include bisphenols, in particular, 2,2-bis (4-hydroxyphenyl) propane. i.e., bisphenol A. Further, a part or all of bisphenol A may be replaced with another dihydric phenol. Examples of the dihydric phenol other than bisphenol A include a compound such as hydroquinone, 4,4-dihydroxydiphenyl and bis(4-hydroxyphenyl)alkane, and halogenated bisphenols such as bis(3,5-dibromo-4-hydroxyphenyl)propane and bis(3,5-dichloro-4-hydroxyphenyl)propane. The polycarbonate may be a homopolymer of one dihydric phenol or a copolymer of two or more dihydric phenols. As polycarbonate resin (C), a resin formed of polycarbonate alone is preferably used. Polycarbonate resin (C) may be a resin obtained by copolymerizing a component other than polycarbonate (e.g., polyester component) within a range where the effect of the present invention is not impaired (20 mass % or less).

It is preferable that polycarbonate resin (C) for use in the present invention has high fluidity, in particular. The melt volume rate (MVR)(unit: $cm^3/10$ min) thereof measured under a load of 1.2 kg at 300° C. is preferably 30 or more. The MVR of polycarbonate resin (C) is preferably 100 or less. Polycarbonate resin (C) has an MVR of preferably 40 to 100, more preferably 40 to 90, and still more preferably 40 to 80. If one having an MVR of less than 30 is used, the fluidity is significantly reduced, and the heat deflection temperature decreases, and/or moldability deteriorates. At an MVR of more than 100, deterioration of physical properties may be caused due to too low a molecular weight and problems such as gas generation tend to be caused due to decomposition.

The content of polycarbonate resin (C) for use in the present invention is 1 to 20 mass %. Containing polycarbonate resin (C) allows sink marks to further decrease. The content of polycarbonate resin (C) is preferably 1 to 18 mass %. A content of more than 20 mass % is not preferred, because the molding cycle is deteriorated due to a decrease in crystallinity, and appearance defects tend to occur due to a decrease in fluidity.

[Copolymerized Polybutylene Terephthalate Resin (D)]

Copolymerized polybutylene terephthalate resin (D) in the present invention is a resin that contains 80 mol % or more of 1,4-butanediol and 120 to 180 mol % of terephthalic acid and 1,4-butanediol in total, based on 100 mol % of the total acid components and 100 mol % of the total glycol components. As the copolymerization component, at least one or more selected from the group consisting of isophthalic acid, sebacic acid, adipic acid, trimellitic acid, 2,6-naphthalenedicarboxylic acid, ethylene glycol, diethylene glycol, neopentyl glycol, 1,4-cyclohexanedimethanol, 1,2-propanediol, 1,3-propanediol, and 2-methyl-1,3-propanediol may be contained. Among them, isophthalic acid is preferred as the copolymerization component, and the copolymerization ratio is preferably 20 to 80 mol %, more preferably 20 to 60 mol %, and still more preferably 20 to 40 mol %, based on 100 mol % of the total acid components constituting copolymerized polybutylene terephthalate resin (D). At a copolymerization ratio of less than 20 mol %, the transferability to a mold is poor, so that a sufficient appearance tends to be hardly obtained. At a copolymerization ratio of more than 80 mol %, the molding cycle and releasability may decrease in some cases.

As a measure of the molecular weight of copolymerized polybutylene terephthalate resin (D), the reduced viscosity (0.1 g of a sample is dissolved in 25 ml of a mixed solvent of phenol/tetrachloroethane (mass ratio: 6/4) for measurement at 30° C. with use of an Ubbelohde viscosity tube) is preferably in the range of 0.4 to 1.5 dl/g, more preferably in the range of 0.4 to 1.3 dl/g, though being slightly different depending on the specific copolymerization composition. At a reduced viscosity of less than 0.4 dl/g, the toughness may decrease, and at a reduced viscosity of more than 1.5 dl/g, the fluidity may decrease.

The content of copolymerized polybutylene terephthalate resin (D) is 3 to 20 mass %. Containing copolymerized polybutylene terephthalate resin (D) allows the appearance of a molding to improve. The content of copolymerized polybutylene terephthalate resin (D) is preferably 4 to 15 mass %, more preferably 5 to 15 mass %, and still more preferably 5 to 13 mass %.

[Inorganic Filler (E)]

Inorganic filler (E) in the present invention is an inorganic filler that is different from fibrous filler (B) described above. It is preferable that inorganic filler (E) in the present invention be an inorganic filler having a spherical and/or amorphous shape rather than a fibrous or tabular shape. The spherical and/or amorphous shape has a major/minor diameter (major diameter/minor diameter), a flatness (minor diameter/thickness), and an aspect ratio (projected area diameter/thickness) each of preferably 3.0 or less, more preferably 2.0 or less. At these values of more than 3.0, the weld strength tends to decrease.

Specific examples thereof include glass beads, silica, calcium carbonate, wollastonite, barium sulfate, small acicular wollastonite, and particulate aluminum borate, though not limited thereto. Further, even those treated with a known coupling agent may be used without any problem. Any particle size of inorganic filler (E) may be used without particular limitation, and, for example, a particle size of 1 to 80 μm is preferred, and a particle size of 2 to 30 μm is more preferred.

The content of inorganic filler (E) is 0 to 20 mass % Inorganic filler (E) may not be contained (blended), but containing inorganic filler (E) allows the heat deflection temperature to be further raised. It is preferable that the content of inorganic filler (E) be 3 to 18 mass %.

[Polyethylene Terephthalate Resin (F)]

Polyethylene terephthalate resin (F) in the present invention is basically a homopolymer of ethylene terephthalate units. Further, based on 100 mol % of all the acid components constituting polyethylene terephthalate resin (F) and 100 mol % of all the glycol components, about up to 5 mol % of other components may be copolymerized. As the other components, diethylene glycol produced through condensation of ethylene glycol during polymerization is included.

As a measure of the molecular weight of polyethylene terephthalate resin (F), the reduced viscosity (0.1 g of a sample is dissolved in 25 ml of a mixed solvent of phenol/tetrachloroethane (mass ratio: 6/4) for measurement at 30° C. with use of an Ubbelohde viscosity tube) is preferably in the range of 0.4 to 1.0 dl/g, more preferably in the range of 0.5 to 0.9 dl/g. At a reduced viscosity of less than 0.4 dl/g, strength of the resin may decrease, and at a reduced viscosity of more than 1.0 dl/g, fluidity of the resin may decrease.

The content of polyethylene terephthalate resin (F) is preferably 0 to 25 mass %, more preferably 0 to 22 mass %. Containing (blending) polyethylene terephthalate resin (F) within the range allows various properties to be satisfied. Containing polyethylene terephthalate resin (F) allows a higher heat deflection temperature to be achieved. In the case where polyethylene terephthalate resin (F) is contained, the content thereof is preferably 10 to 25 mass %, more preferably 13 to 22 mass %

[Other Additives]

The polybutylene terephthalate resin composition of the present invention may contain various known additives on an as needed basis, within a range where properties in the present invention are not impaired. Examples of the known additives include a colorant such as a pigment, a mold release agent, a heat resistance stabilizer, an antioxidant, an ultraviolet absorber, alight stabilizer, a plasticizer, a modifier, an antistatic agent, a flame retardant, a dye, and a transesterification inhibitor.

Examples of the mold release agent include a long-chain fatty acid or an ester thereof and a metal salt thereof, an amide compound, a polyethylene wax, silicon, and polyethylene oxide. As the long-chain fatty acid, one having 12 or more carbon atoms is particularly preferred, and examples thereof include stearic acid, 12-hydroxystearic acid, behenic acid, and montanic acid. A part or the whole of carboxylic acid may be esterified with monoglycol or polyglycol, or may form a metal salt. Examples of the amide compound include ethylene bis-terephthalamide and methylene bis-stearylamide. These mold release agents may be used alone or as a mixture.

As the name implies, the transesterification inhibitor is a stabilizer that prevents the transesterification reaction of a polyester resin. In an alloy of polyester resins alone, transesterification occurs to not a small extent due to heat history, no matter how optimized the production conditions are. If it occurs to a very large extent, the desired characteristics of the alloy cannot be obtained. In particular, transesterification between polybutylene terephthalate and polycarbonate often occurs, and in that case, the crystallinity of polybutylene terephthalate is significantly reduced, which is not preferable. In the present invention, by addition of the transesterification inhibitor, the transesterification reaction between polybutylene terephthalate resin (A) and polycarbonate resin (C) is particularly prevented, so that appropriate crystallinity can be maintained. As the transesterification inhibitor, a phosphorus compound having a catalyst deactivation effect on the polyester resin may be preferably used, and for example, "ADEKA STAB AX-71" manufactured by ADEKA Corporation may be used. The content of the transesterification inhibitor is preferably 0.05 to 2 mass %, more preferably 0.1 to 0.5 mass %.

These various additives may be contained in a total amount of up to 5 mass %, based on 100 mass % of the polybutylene terephthalate resin composition. In other words, it is preferable that the total amount of (A), (B), (C), (D), (E) and (F) be 95 to 100 mass %, in 100 mass % of the polybutylene terephthalate resin composition. (F) described above is an optional component.

Since it has the constitution described above, the polybutylene terephthalate resin composition in the present invention can have a satisfactory heat deflection temperature of 190° C. or more, as measured by a method described below, it is more preferable that the heat deflection temperature be 192° C. or more.

EXAMPLES

The present invention will be specifically described with reference to Examples and Comparative Examples, though the present invention is not limited thereto. The measured values described in Examples were measured by the following methods. Test pieces for use in the measurement were prepared as follows. Pellets of the resulting polybutylene terephthalate resin composition were dried at 130° C. for 4 hours and then formed into a shape in accordance with ISO 3167, by an injection molding machine (J110AD-110H, manufactured by The Japan Steel Works. Ltd.) under conditions at a cylinder temperature of 270° C., and a mold temperature of 80° C.

(1) Bending Strength, Bending Modulus, and Deflection Ratio

The measurement was performed in accordance with ISO-178.

(2) Charpy Impact Strength

The measurement was performed in accordance with JIS K7111.

(3) Heat Deflection Temperature

The measurement was performed in accordance with JIS K7191-2: 2007 Loading was performed at 1.80 MPa.

(4) Appearance of Molding

Pellets of the resulting polybutylene terephthalate resin composition were dried at 130° C. for 4 hours and then formed into a molding having a length of 100 mm, a width of 100 mm and a thickness of 2 mm, by an injection molding machine (J110AD-110H, manufactured by The Japan Steel Works, Ltd.) under conditions at a cylinder temperature of 270° C., and a mold temperature of 80° C., in an injection speed range with a filling time of 1 second. The appearance of the molding was visually observed.

good: Good. The surface is glossy, having no appearance defect at all.

decent: In a part (particularly at an end or in the vicinity of a molding), some appearance defects occur.

bad: Appearance defects occur on the whole of a molding.

(5) Evaluation on Sink Mark

Pellets of the resulting polybutylene terephthalate resin composition were dried at 130° C. for 4 hours and then formed into a molding having a length of 100 mm, a width of 100 mm and a thickness of 4 mm, by an injection molding machine (J110AD-110H, manufactured by The Japan Steel Works, Ltd.) under conditions including a cylinder temperature of 270° C., a mold temperature of 80° C., an injection time of 8 seconds, a filling time of 1 second, a dwelling pressure of 60 MPa, and a cooling time of 15 seconds. The appearance of the injection molded test pieces was visually observed and evaluated based on the following criteria.

good: No sink mark was identified.

bad: A sink mark was identified.

The blending components for use in Examples and Comparative Examples are as follows.

Polybutylene terephthalate resin (A):

(A-1) Polybutylene terephthalate resin: manufactured by Toyobo Co., Ltd., intrinsic viscosity: 0.83 dl/g (A-2) Polybutylene terephthalate resin: manufactured by Toyobo Co, Ltd., intrinsic viscosity: 0.75 dl/g (A-3) Polybutylene terephthalate resin: manufactured by Toyobo Co., Ltd. intrinsic viscosity: 0.68 dl/g (A-4) Polybutylene terephthalate resin: manufactured by Toyobo Co., Ltd, intrinsic viscosity: 1.10 dl/g Fibrous Filler (B):

(B) Glass fiber (average fiber length: 3 mm, average fiber diameter 11 μm): T-120H manufactured by Nitto Boseki Co., Ltd.

Polycarbonate Resin (C):

(C-1): "CALIBRE 301-40" manufactured by Sumika Styron Polycarbonate Ltd, melt volume rate (300° C., load: 1.2 kg): 40 cm$^3$/10 min (C-2): "CALIBRE 200-80" manufactured by Sumika Styron Polycarbonate Ltd, melt volume rate (300° C. load: 1.2 kg): 80 cm$^3$/10 min (C-3): "CALIBRE 301-6" manufactured by Sumika Styron Polycarbonate Ltd., melt volume rate (300° C. load: 1.2 kg): 6 cm$^3$/10 min Copolymerized Polybutylene Terephthalate Resin (D):

(D). Copolymer having a composition ratio TPA/IPA/1,4-BD=70/30/100 mol %, manufactured by Toyobo Co., Ltd., prototype of Toyobo Byron (registered trademark), reduced viscosity: 0.73 dl/g (TPA represents terephthalic acid, IPA represents isophthalic acid, and 1,4-BD represents 1,4-butanediol.)

Inorganic Filler (E):

(E-1): Calcium carbonate: "Whiten P-30" manufactured by Shiraishi Calcium Kaisha, Ltd., amorphous filler (E-2). Glass beads. "EGB731B" manufactured by Potters-Ballotini Co., Ltd., spherical filler Polyethylene Terephthalate Resin (F):

(F): Polyethylene terephthalate resin: manufactured by Toyobo Co., Ltd., reduced viscosity: 0.63 dl/g Transesterification inhibitor: "ADEKA STAB AX-71" manufactured by ADEKA Corporation Examples 1 to 10, and Comparative Examples 1 to 6

The respective components were blended by a tumbler to make a composition shown in Table 1 and melt-kneaded by a twin-screw extruder (STS35 manufactured by Coperion gmbh) to obtain pellets of the composition.

The resulting pellets of the composition were dried, and evaluated by the methods described above. The results are shown in Tables 1.

TABLE 1

|   |   |   | Example 1 | Example 2 | Example 3 | Example 4 | Example 5 |
|---|---|---|---|---|---|---|---|
| Composition | A-1 | Mass % |  |  |  | 27.8 |  |
|  | A-2 | Mass % | 30.8 | 27.8 | 25.8 |  |  |
|  | A-3 | Mass % |  |  |  |  | 25.8 |
|  | B | Mass % | 30 | 30 | 30 | 30 | 30 |
|  | C-1 | Mass % |  |  |  |  |  |
|  | C-2 | Mass % | 15 | 5 | 3 | 5 | 3 |
|  | D | Mass % | 5 | 10 | 10 | 10 | 10 |
|  | E-1 | Mass % |  |  | 10 | 15 | 10 | 15 |
|  | E-2 | Mass % |  |  |  |  |  |
|  | F | Mass % | 19 | 17 | 16 | 17 | 16 |
|  | Transesterification inhibitor | Mass % | 0.2 | 0.2 | 0.2 | 0.2 | 0.2 |
| Properties | Bending strength | MPa | 192 | 196 | 194 | 188 | 190 |
|  | Bending modulus | GPa | 8.9 | 10.1 | 10.7 | 10.1 | 10.7 |
|  | Deflection ratio | % | 2.5 | 2.3 | 2.2 | 2.4 | 2.2 |
|  | Charpy impact strength | kJ/m$^2$ | 8.7 | 9.3 | 9.3 | 8.6 | 9.4 |
|  | Heat deflection temperature | ° C. | 191 | 193 | 194 | 195 | 196 |
|  | Appearance |  | good | good | good | good | good |
|  | Evaluation on sink mark |  | good | good | good | good | good |

TABLE 1-continued

|  |  |  | Example 6 | Example 7 | Example 8 | Example 9 | Example 10 |
|---|---|---|---|---|---|---|---|
| Composition | A-1 | Mass % |  |  |  |  |  |
|  | A-2 | Mass % | 25.8 | 30.8 | 27.8 | 26.8 | 32.8 |
|  | A-3 | Mass % |  |  |  |  |  |
|  | B | Mass % | 30 | 25 | 40 | 30 | 30 |
|  | C-1 | Mass % |  |  |  | 7 | 7 |
|  | C-2 | Mass % | 3 | 15 | 3 |  |  |
|  | D | Mass % | 10 | 5 | 10 | 10 | 20 |
|  | E-1 | Mass % |  |  |  | 10 | 10 |
|  | E-2 | Mass % | 15 | 5 |  |  |  |
|  | F | Mass % | 16 | 19 | 19 | 16 |  |
|  | Transesterification inhibitor | Mass % | 0.2 | 0.2 | 0.2 | 0.2 | 0.2 |
| Properties | Bending strength | MPa | 192 | 193 | 192 | 190 | 187 |
|  | Bending modulus | GPa | 10.8 | 9.0 | 10.8 | 10.1 | 10.1 |
|  | Deflection ratio | % | 2.1 | 2.5 | 2.1 | 2.4 | 2.3 |
|  | Charpy impact strength | kJ/m$^2$ | 9.1 | 8.8 | 9.1 | 8.6 | 8.6 |
|  | Heat deflection temperature | °C. | 194 | 194 | 194 | 196 | 190 |
|  | Appearance |  | good | good | good | good | good |
|  | Evaluation on sink mark |  | good | good | good | good | good |

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Composition | A-1 | Mass % |  |  |  | 32.8 | 29.8 | 35.8 |
|  | A-2 | Mass % |  | 25.8 | 30.8 |  |  |  |
|  | A-4 | Mass % | 25.8 |  |  |  |  |  |
|  | B | Mass % | 30 | 30 | 30 | 30 | 30 | 30 |
|  | C-1 | Mass % |  |  |  |  |  |  |
|  | C-2 | Mass % | 3 |  |  | 5 |  |  |
|  | C-3 | Mass % |  | 3 | 15 |  |  |  |
|  | D | Mass % | 10 | 10 | 5 |  | 10 |  |
|  | E-1 | Mass % | 15 | 15 |  | 10 | 10 | 10 |
|  | E-2 | Mass % |  |  |  |  |  |  |
|  | F | Mass % | 16 | 16 | 19 | 22 | 20 | 24 |
|  | Transesterification inhibitor | Mass % | 0.2 | 0.2 | 0.2 | 0.2 | 0.2 | 0.2 |
| Properties | Bending strength | MPa | 184 | 186 | 194 | 191 | 195 | 191 |
|  | Bending modulus | GPa | 10.3 | 10.2 | 9.1 | 9.3 | 10.1 | 10.0 |
|  | Deflection ratio | % | 2.4 | 2.3 | 2.5 | 2.5 | 2.3 | 2.3 |
|  | Charpy impact strength | kJ/m$^2$ | 8.8 | 8.9 | 8.6 | 8.5 | 9.1 | 9.1 |
|  | Heat deflection temperature | °C. | 182 | 181 | 175 | 192 | 195 | 193 |
|  | Appearance |  | good | good | bad | bad | good | bad |
|  | Evaluation on sink mark |  | good | good | good | good | bad | bad |

As can be seen in Examples 1 to 10 in Table 1, through adjustment of the ratio between the fibrous filler and the polycarbonate resin and adjustment of blending of the copolymerized polybutylene terephthalate resin for improving appearance, the heat deflection temperature, the appearance, and the sink marks can be balanced.

As can be seen in Examples 4 and 5, the polybutylene terephthalate resin having an intrinsic viscosity in the specified range can be used while maintaining the properties, but one having an intrinsic viscosity exceeding the specified value allows the heat deflection temperature to decrease as in Comparative Example 1. Further, as can be seen in Example 9, the polycarbonate resin having an MVR in the specified range can be used while maintaining the properties, but at an MVR out of the specified range, the heat deflection temperature decreases as in Comparative Examples 2 and 3. From these, it can be seen that in the case where the viscosity of the polybutylene terephthalate resin and the polycarbonate resin is within the specified range, both remedying sink marks and suppressing decrease in heat deflection temperature are achieved at the same time.

As can be seen in Example 8, even in the case where the glass fiber content is increased, the appearance, sink marks, and heat deflection temperature can be balanced through adjustment of blending of the polycarbonate resin and the copolymerized polybutylene terephthalate resin.

As in Comparative Examples 4 to 6, it can be seen that the appearance, sink marks, and beat deflection temperature cannot be balanced unless all the conditions including the presence/absence of addition of the respective components, amount of addition, and viscosity are satisfied.

From the above, use of the polybutylene terephthalate resin composition within the composition ratio described in the present invention can provide a polybutylene terephthalate resin composition that satisfies all of the appearance, sink marks, and suppression of a decrease in heat deflection temperature.

INDUSTRIAL APPLICABILITY

In comparison with a conventional polybutylene terephthalate resin composition, the resin composition of the present invention can suppress sink marks while maintaining the heat deflection temperature, being useful as a material of a molding in a complicate shape having bosses and ribs.

The invention claimed is:

1. A polybutylene terephthalate resin composition comprising 20 to 50 mass % of a polybutylene terephthalate resin (A) having an intrinsic viscosity of 0.75 to 1.0 dl/g, 20 to 40 mass % of a fibrous filler (B), 1 to 20 mass % of a polycarbonate resin (C) having a melt volume rate (MVR) of 40 to 100 cm3/10 min under a load of 1.2 kg at 300° C., 3 to 20 mass % of a copolymerized polybutylene terephthalate resin (D), 3 to 20 mass % of an inorganic filler (E) other than the fibrous filler (B), and 10 to 25 mass % of a polyethylene terephthalate resin (F), wherein the inorganic filler (E) is at least one selected from the group consisting of glass beads, silica, calcium carbonate, wollastonite, barium sulfate, and aluminum borate, and a heat deflection temperature of the polybutylene terephthalate resin composition is 190° C. or more.

* * * * *